(12) United States Patent
Mao

(10) Patent No.: US 9,792,478 B2
(45) Date of Patent: *Oct. 17, 2017

(54) METHODS AND SYSTEMS FOR A BIND FREE PIVOTING TRIGGER MECHANISM

(71) Applicant: SYMBOL TECHNOLOGIES, LLC, Lincolnshire, IL (US)

(72) Inventor: Yanmin Mao, Brampton (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,858

(22) Filed: Nov. 2, 2016

(65) Prior Publication Data

US 2017/0147846 A1    May 25, 2017

Related U.S. Application Data

(63) Continuation of application No. 14/947,698, filed on Nov. 20, 2015, now Pat. No. 9,576,173.

(51) Int. Cl.
| | | |
|---|---|---|
| *G06K 7/10* | (2006.01) | |
| *G06K 19/06* | (2006.01) | |
| *G06K 7/14* | (2006.01) | |
| *H01H 9/08* | (2006.01) | |
| *H01H 21/24* | (2006.01) | |

(52) U.S. Cl.
CPC ....... *G06K 7/10881* (2013.01); *G06K 7/1413* (2013.01); *G06K 19/06028* (2013.01); *H01H 9/08* (2013.01); *H01H 21/24* (2013.01)

(58) Field of Classification Search
CPC ............. G06K 7/10881; G06K 7/1413; G06K 7/10643; G06K 7/1091; G06K 2007/10524; G06K 19/06028; G06F 3/0202; H01H 9/08; H01H 21/24
USPC ........................................ 235/462.48, 472.01
See application file for complete search history.

(56) References Cited

U.S. PATENT DOCUMENTS

| | | |
|---|---|---|
| 4,460,120 A | 7/1984 | Shepard et al. |
| 5,059,778 A | 10/1991 | Zouzoulas et al. |
| 5,250,792 A | 10/1993 | Swartz et al. |
| 5,510,589 A | 4/1996 | Arnal |
| 5,598,082 A | 1/1997 | Gilpin et al. |
| 5,752,596 A | 5/1998 | Chu |

(Continued)

OTHER PUBLICATIONS

International Search Report and Written Opinion for corresponding International Patent Application No. PCT/US2016/061045 dated Feb. 3, 2017.

*Primary Examiner* — Claude J Brown

(57) ABSTRACT

A trigger assembly including a cylindrical pivot shaft having a pivot-shaft longitudinal axis; a trigger key having a front face, a back face opposite the front face, an actuator extending from the back face, and a trigger-key longitudinal axis, wherein the a first end on the of the trigger key has a plurality of through holes arranged to receive the cylindrical pivot shaft; a trigger-key support having an aperture for the actuator to pass through, the trigger-key support further having a plurality of pivot-shaft supports, wherein each pivot-shaft support includes a concave surface configured to receive the cylindrical pivot shaft; and a trigger bezel having a plurality of substantially flat surfaces positioned to constrain the pivot shaft in opposition to the plurality of pivot-shaft supports, wherein the substantially flat surfaces are located at different positions along the pivot-shaft longitudinal axis than are the pivot-shaft supports.

21 Claims, 18 Drawing Sheets

(56) References Cited

U.S. PATENT DOCUMENTS

| | | |
|---|---|---|
| 5,767,502 A | 6/1998 | Ferland et al. |
| 5,984,788 A | 11/1999 | Lebensfeld et al. |
| 5,996,896 A | 12/1999 | Grabon |
| 6,321,990 B1 | 11/2001 | Giordano et al. |
| 6,390,390 B1 | 5/2002 | Hung |
| 8,134,430 B2 | 3/2012 | Chen et al. |
| 2003/0234291 A1 | 12/2003 | Wulff et al. |
| 2007/0119948 A1 | 5/2007 | Mitelman et al. |
| 2009/0266897 A1 | 10/2009 | Drzymala |
| 2010/0258631 A1 | 10/2010 | Rueblinger et al. |
| 2012/0088547 A1 | 4/2012 | Lee et al. |
| 2014/0039512 A1 | 2/2014 | He et al. |

METHODS AND SYSTEMS FOR A BIND FREE PIVOTING TRIGGER MECHANISM

BACKGROUND OF THE INVENTION

A trigger is a frequently used aspect of a mobile electronic device such as a handheld scanner. Because it is used so often, it may also be the most serviced aspect, leading to increased maintenance costs and reduced operational time for the scanner.

Accordingly, there is a need for an improved trigger mechanism.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
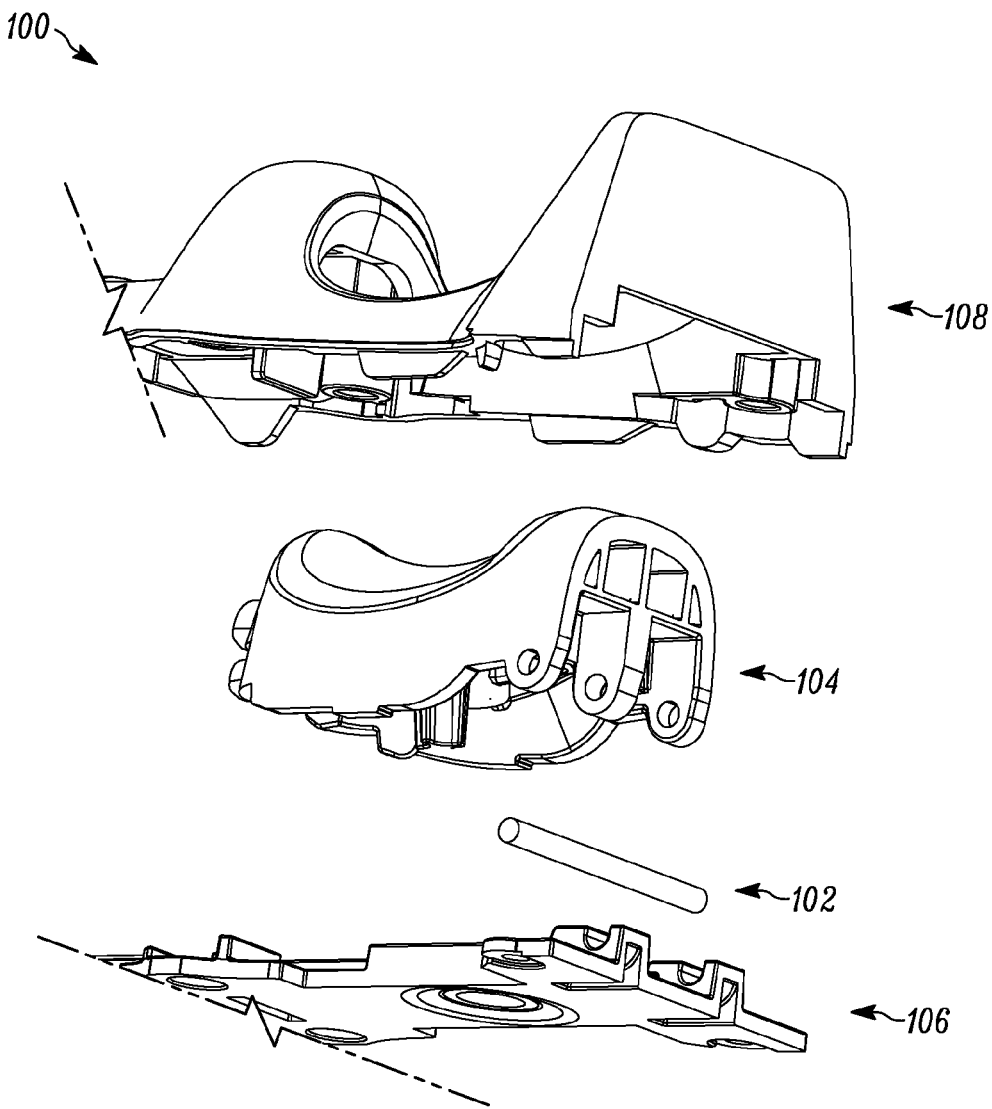
FIG. 1A depicts an unassembled view of a trigger assembly, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment takes the form of a trigger assembly, including a cylindrical pivot shaft having a pivot-shaft longitudinal axis; a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis; a trigger-key support having an aperture for the actuator to pass through, the trigger-key support further having a plurality of pivot-shaft supports, wherein each pivot-shaft support includes a concave surface configured to receive the cylindrical pivot shaft; and a trigger bezel having a plurality of substantially flat surfaces positioned to constrain the pivot shaft in opposition to the plurality of pivot-shaft supports, wherein the substantially flat surfaces are located at different positions along the pivot-shaft longitudinal axis than are the pivot-shaft supports.

In at least one embodiment, the pivot shaft is made of metal.

In at least one embodiment, the trigger assembly further includes a spring configured to exert opposing forces on the back face and the trigger-key support.

In at least one embodiment, the trigger assembly further includes means to removably attach the trigger assembly to a mobile electronic device.

In at least one embodiment, the trigger assembly further includes a trigger-key stop mechanism.

In at least one embodiment, the trigger assembly further includes comprising at least one additional key. In such an embodiment, the at least one additional key comprises a push-to-talk (PTT) key. In another such embodiment, the at least one additional key comprises a programmable key.

In at least one embodiment, the trigger key and the received pivot shaft are disposed between the trigger-key support and the trigger bezel, and the trigger bezel attaches to the trigger-key support.

In at least one embodiment, the concave surface has a parabolic shape.

In at least one embodiment, the concave surface has a semi-circular shape.

In at least one embodiment, each pivot-shaft support further comprises walls adjacent to the concave surface, wherein the walls and the concave surface are collectively configured in a U shape.

In at least one embodiment, the trigger assembly further includes at least one pivot-shaft constraint configured to restrict translation of the pivot shaft along the pivot-shaft longitudinal axis. In such an embodiment, at least one of the at least one pivot-shaft constraints is disposed on the trigger key. In another such embodiment, at least one of the at least one pivot-shaft constraints is disposed on the trigger bezel; at least one of the at least one pivot-shaft constraints is disposed on the trigger-key support.

In at least one embodiment, at least two of the pivot-shaft supports are at respective proximal locations relative to and on respective opposing sides of a center point along the pivot-shaft longitudinal axis; and at least two of the substantially flat surfaces are at respective distal locations relative to and on respective opposing sides of the center point along the pivot-shaft longitudinal axis.

Another embodiment takes the form of a mobile electronic device that includes a trigger assembly comprising: a cylindrical pivot shaft having a pivot-shaft longitudinal axis, a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis, a trigger-key support having an aperture for the actuator to pass through, the trigger-key support further having a plurality of pivot-shaft supports, wherein each pivot-shaft support includes a concave surface configured to receive the cylindrical pivot shaft, and a trigger bezel having a plurality of substantially flat surfaces positioned to constrain the pivot shaft in opposition to the plurality of pivot-shaft supports, wherein the substantially flat surfaces are located at different positions along the pivot-shaft longitudinal axis than are the pivot-shaft supports; a circuit-board assembly comprising an electrical connector and a switch, the switch configured to be depressed by the actuator; and a housing, the housing configured to: mechanically receive the circuit-board assembly, electrically connect to the electrical connector, and removably attach to the trigger assembly.

In another such embodiment, the trigger assembly further comprises a trigger-stop mechanism that is configured, in response to a trigger-key pressure, to: permit the actuator to move a trigger-travel distance to engage the switch; and transfer a portion of the trigger-key pressure to the housing after the actuator moves the trigger-travel distance.

In another such embodiment, the circuit-board assembly comprises a sealing coat configured to seal an internal portion of the housing when the circuit board assembly is mechanically received in the housing.

Another embodiment takes the form of a mobile electronic device that includes a trigger assembly that includes: a cylindrical pivot shaft having a pivot-shaft longitudinal axis, a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis, a trigger-key support having an aperture for the actuator to pass through, the trigger-key support further having a plurality of pivot-shaft supports, wherein each pivot-shaft support includes a concave surface configured to receive the cylindrical pivot shaft, and a trigger bezel having a plurality of substantially flat surfaces positioned to constrain the pivot shaft in opposition to the plurality of pivot-shaft supports, wherein the substantially flat surfaces are located at different positions along the pivot-shaft longitudinal axis than are the pivot-shaft supports; a switch configured to be depressed by the actuator; and a data-acquisition device configured to actuate in response to the switch being depressed.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with the various figures are presented by way of example and not by way of limitation. As such, any and all statements or other indications as to what a particular figure "depicts," what a particular element or entity in a particular figure "is" or "has," and any and all similar statements that may in isolation and out of context be read as absolute and therefore limiting can only properly be read as being constructively preceded by a clause such as "In at least one embodiment, . . . " And it is for reasons akin to brevity and clarity of presentation that this implied leading clause is not repeated ad nauseum in this detailed description.

FIG. 1A depicts an unassembled view of a trigger assembly, in accordance with some embodiments. In particular, FIG. 1A depicts a trigger assembly 100. The trigger assembly 100 comprises a cylindrical pivot shaft 102, a trigger key 104, a trigger-key support 106, and a trigger-key bezel 108. The components of the trigger assembly 100 are discussed in detail throughout the description. In some embodiments, the pivot shaft 102 is made of metal.

Figure 1B:
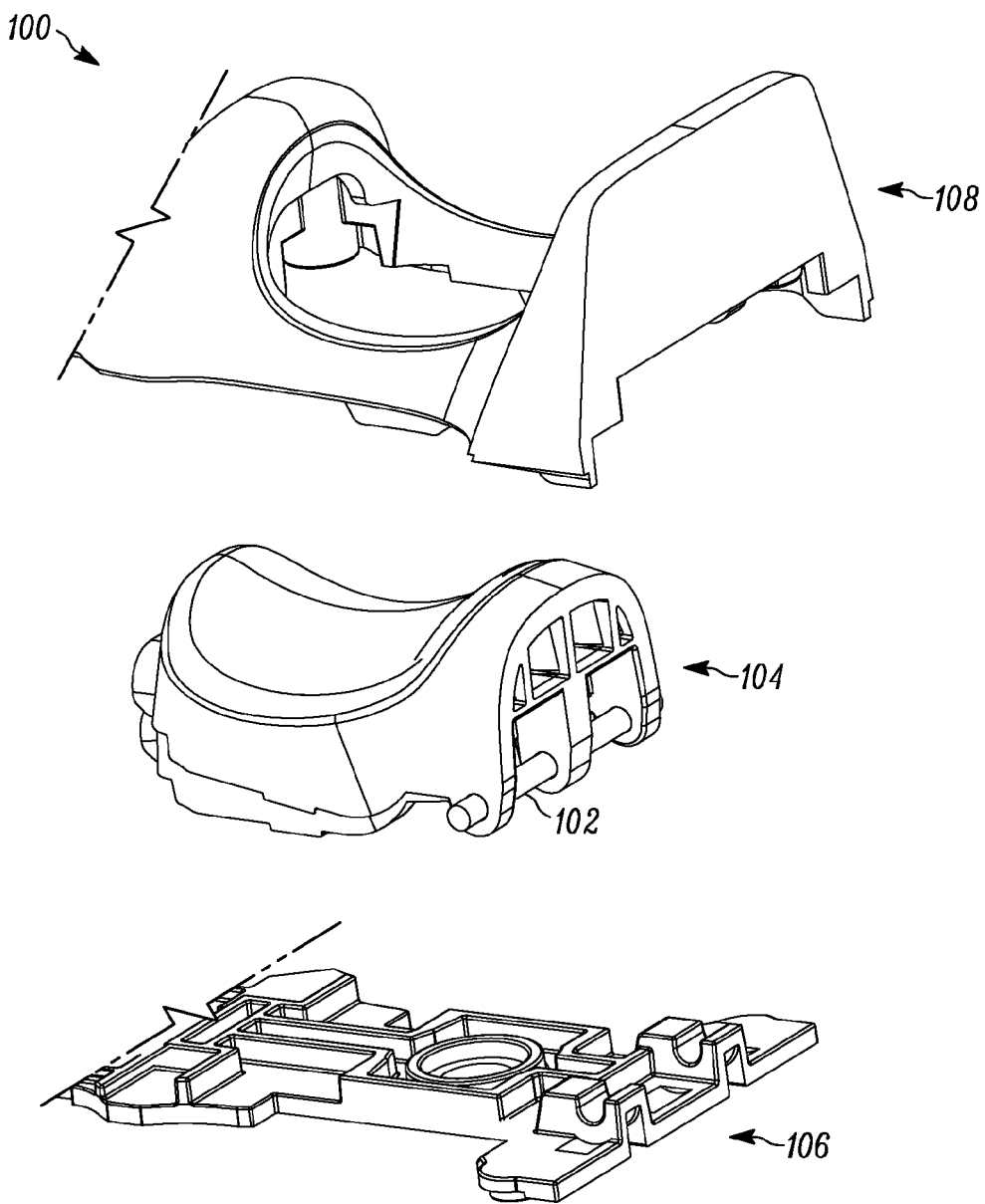
FIG. 1B depicts a partially assembled view of a trigger assembly, in accordance with some embodiments.

FIG. 1B depicts a partially assembled view of a trigger assembly, in accordance with some embodiments. In particular, FIG. 1B depicts the trigger assembly 100 in a partially assembled condition. In the partially assembled condition, the trigger key 104 receives the pivot shaft 102. The trigger key 104, with the received pivot shaft 102 are placed between the trigger-key support 106 and the trigger bezel 108.

Figure 1C:
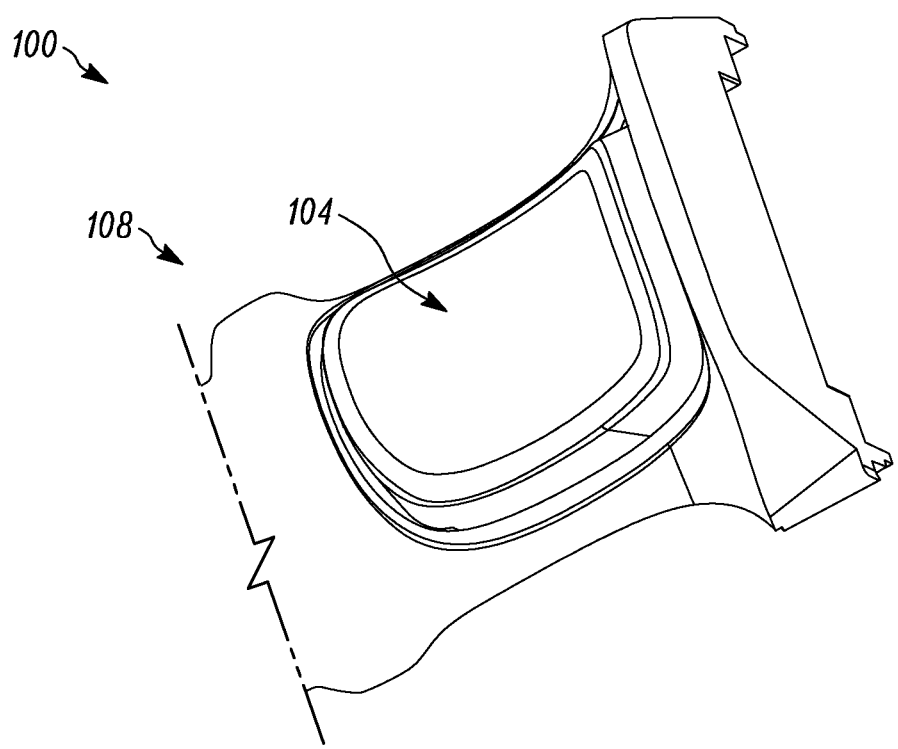
FIG. 1C depicts an assembled view of a trigger assembly, in accordance with some embodiments.

FIG. 1C depicts an assembled view of a trigger assembly, in accordance with some embodiments. In particular, FIG. 1C depicts the trigger assembly 100 in an assembled condition. In the assembled condition, the trigger key 104 with received pivot shaft 102, is disposed between the trigger key support (shown in FIGS. 1A and 1B) and the trigger bezel 108.

Figure 2A:
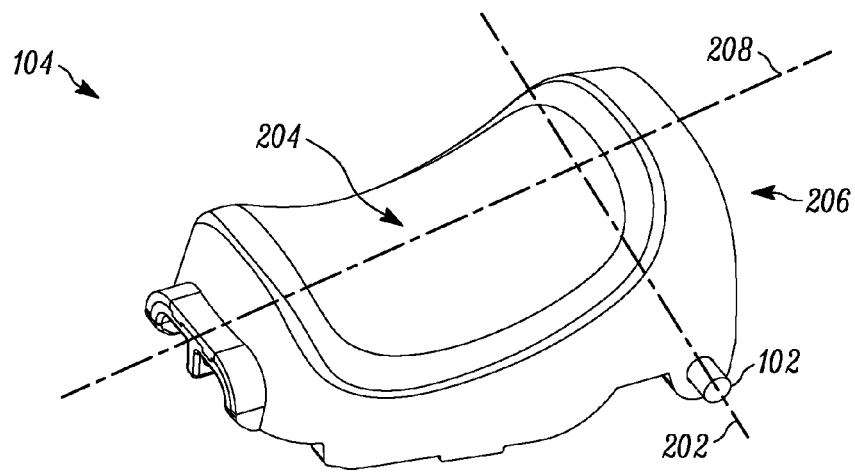
FIG. 2A depicts a top-side perspective view of a trigger key with a received pivot shaft, in accordance with some embodiments.

FIG. 2A depicts a top-side perspective view of a trigger key with a received pivot shaft, in accordance with some embodiments. In particular, FIG. 2A depicts the trigger key 104 with the received pivot shaft 102 from a top-side view. The pivot shaft 102 has a longitudinal axis 202. The trigger key 104 includes a front face 204, a first end 206, and a trigger-key longitudinal axis 208.

Figure 2B:
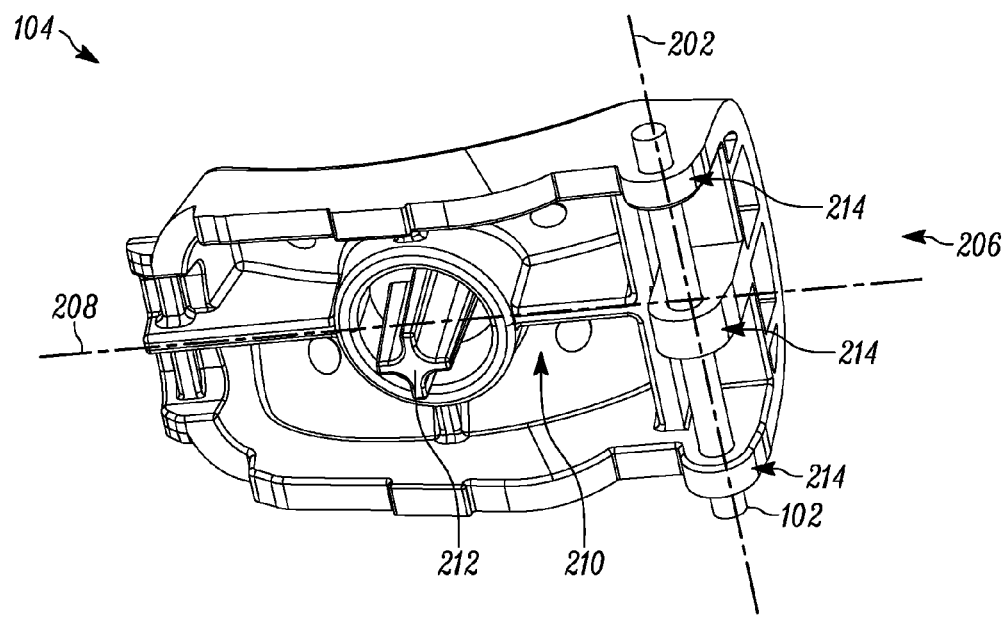
FIG. 2B depicts a bottom-side perspective view of a trigger key with a received pivot shaft, in accordance with some embodiments.

FIG. 2B depicts a bottom-side perspective view of a trigger key with a received pivot shaft, in accordance with some embodiments. In particular, FIG. 2B depicts the trigger key 104 with the received pivot shaft 102 from the bottom. In addition to the components visible from in the top view (FIG. 2A), the trigger key 104 further includes a back face 210 opposite the front face 204, an actuator 212, and a plurality of through holes 214.

The FIGS. 2A and 2B together depict multiple views of the trigger key 104 with the received pivot shaft 102. The views show the plurality of through holes 214 arranged on the first end 206. The plurality of through holes 214 are arranged to receive the pivot shaft 102 so that the pivot-shaft longitudinal axis 202 is perpendicular to the trigger-key longitudinal axis 208. The actuator 212 extends from the back face 210.

Figure 3:
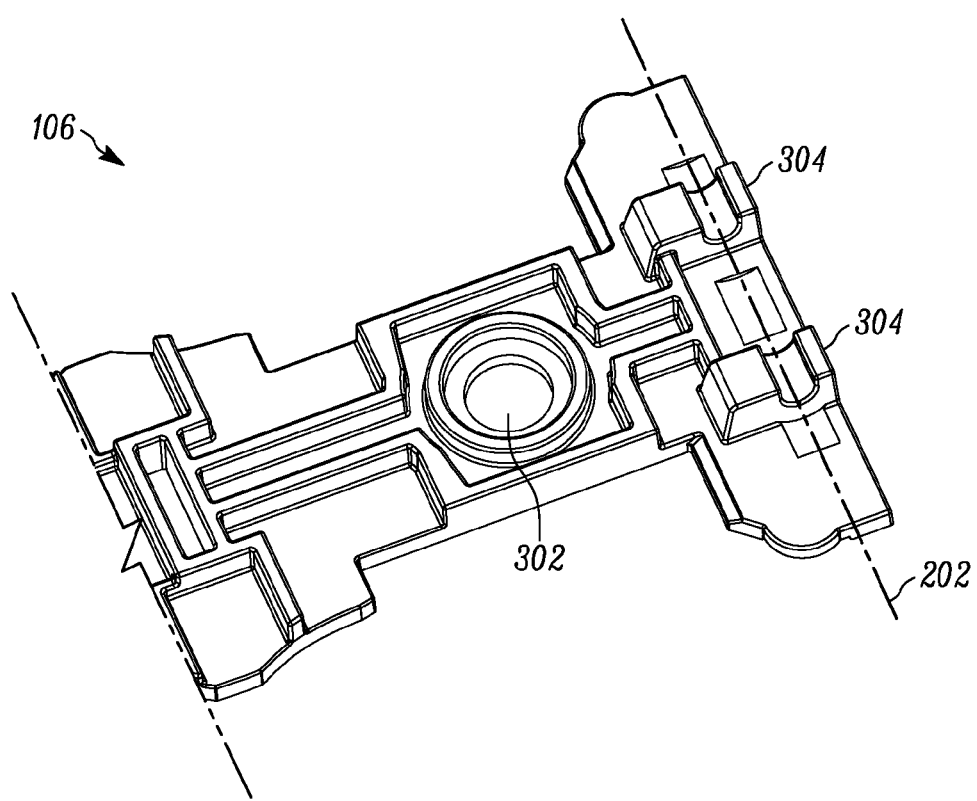
FIG. 3 depicts a perspective view of a trigger-key support, in accordance with some embodiments.

FIG. 3 depicts a perspective view of a trigger-key support, in accordance with some embodiments. In particular, FIG. 3 depicts the trigger-key support 106. The trigger key support 106 includes an aperture 302 and a plurality of pivot-shaft supports 304.

The aperture 302 is positioned and sized to permit the trigger-key actuator 212 to pass therethrough to, e.g., access a switch. The plurality of pivot-shaft supports 304 are positioned along the pivot-shaft longitudinal axis 202. Each of the plurality of the pivot-shaft supports 304 include a concave surface configured to receive the cylindrical pivot shaft.

In some embodiments, the pivot-shaft support's concave surface is circular, semi-circular, parabolic, or the like. The pivot-shaft support may further include walls adjacent to the concave surface, wherein the walls and the concave surface are collectively configured to a U shape. The walls adjacent to the concave surface can alternatively be tapered, similar to the top part of a V, before reaching the concave surface.

Figure 4A:
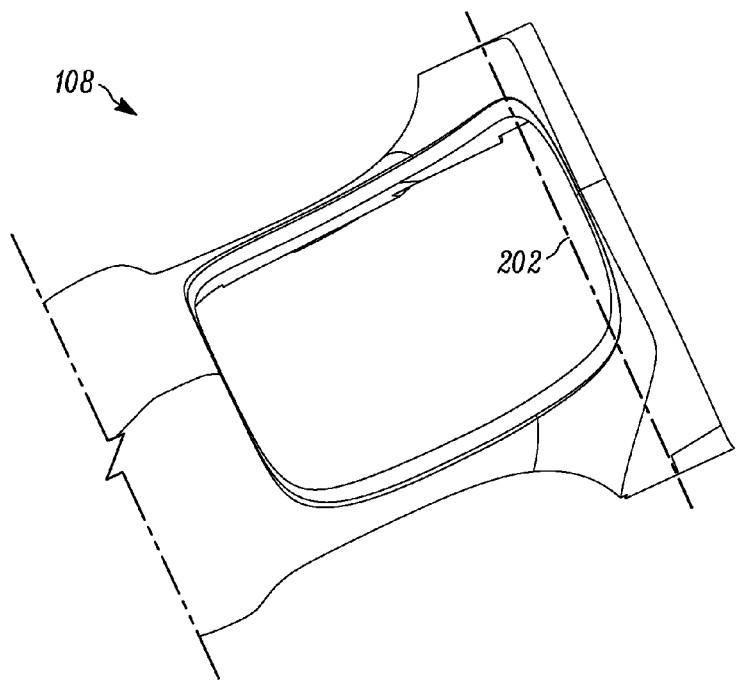
FIG. 4A depicts a top-side perspective view of a trigger bezel, in accordance with some embodiments.

FIG. 4A depicts a top-side perspective view of a trigger bezel, in accordance with some embodiments. In particular, FIG. 4A depicts a top view of the trigger bezel 108. The FIG. 4A additionally depicts the position of the pivot-shaft longitudinal axis 202 when the trigger assembly is assembled.

Figure 4B:
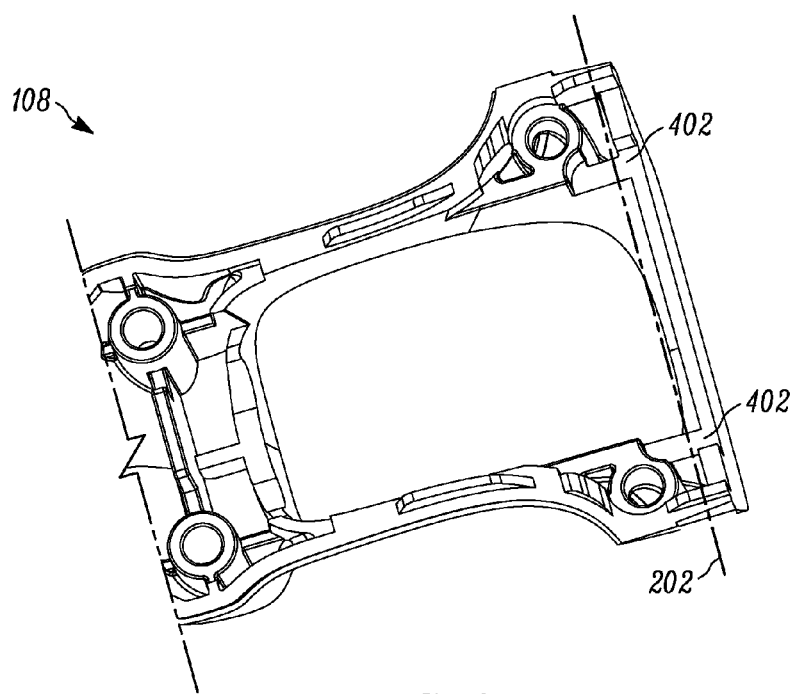
FIG. 4B depicts a bottom-side perspective view of a trigger bezel, in accordance with some embodiments.

FIG. 4B depicts a bottom-side perspective view of a trigger bezel, in accordance with some embodiments. In particular, FIG. 4B depicts a bottom view of the trigger bezel 108. The FIG. 4B additionally depicts the position of the pivot-shaft longitudinal axis 202 when the trigger assembly is assembled and a plurality of substantially flat surfaces 402. The plurality of substantially flat surfaces 402 are positioned to constrain the pivot shaft 102 in opposition to the pivot-shaft supports 304. The pivot-shaft supports 304 and the plurality of substantially flat surfaces 402 are located along different positions along the pivot-shaft longitudinal axis 202.

Figure 5A:
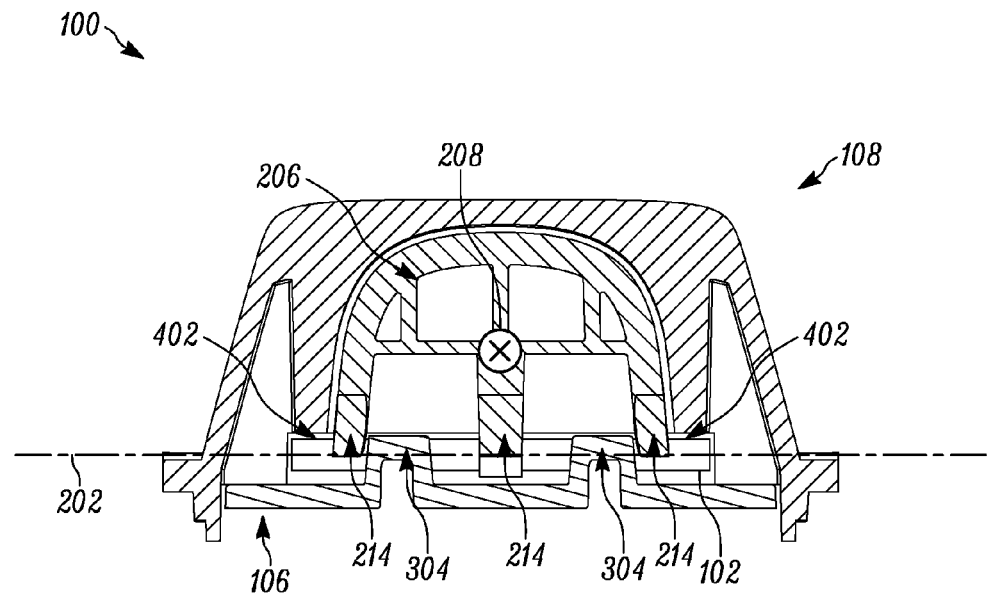
FIG. 5A depicts a cross-sectional view of a trigger assembly, in accordance with some embodiments.

FIG. 5A depicts a cross-sectional view of a trigger assembly, in accordance with some embodiments. In particular, FIG. 5A depicts a cross-sectional view of the trigger assembly 100. The cross section is taken in a plane in line with the pivot-shaft longitudinal axis near the trigger-shaft's location in a trigger assembly. The cross-sectional view depicts the pivot shaft 102, the trigger-key support 106, the pivot-shaft longitudinal axis 202, the first end 206, the trigger key longitudinal axis 208, the plurality of through holes 214, the trigger-key supports 304, and the plurality of substantially flat surfaces 402.

In FIG. 5A, the plurality of through holes 214 on the first end 206 receive the pivot shaft 102 along its longitudinal axis 202. The trigger-key longitudinal axis 208, pictured as extending into FIG. 5A, is perpendicular to the pivot-shaft longitudinal axis. The pivot shaft 102 is supported by the concave surfaces on each of the plurality of pivot-shaft supports 304. The pivot shaft 102 is constrained by the plurality of substantially flat surfaces 402 in opposition to the plurality of the pivot-shaft supports.

Figure 5B:
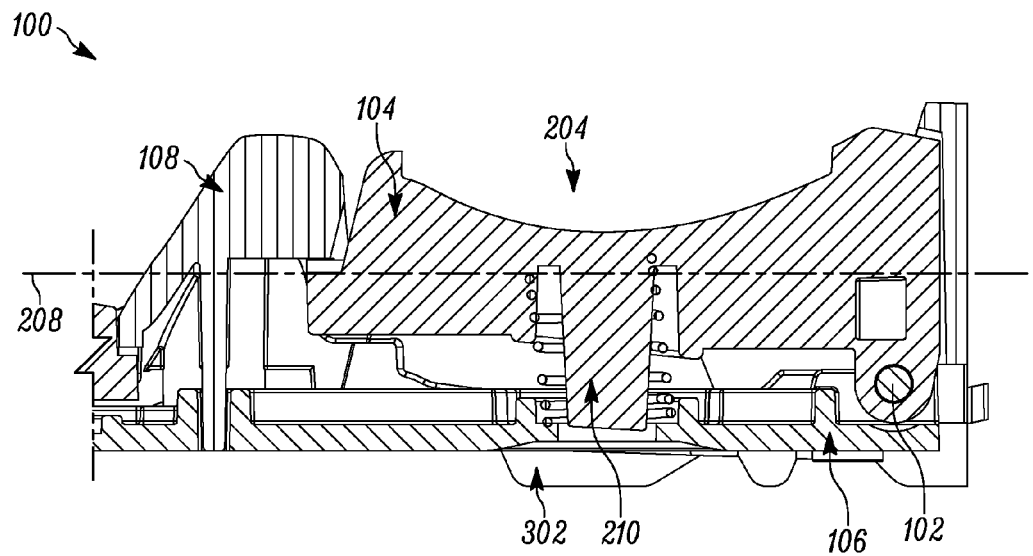
FIG. 5B depicts a cross-sectional view of a trigger assembly, in accordance with some embodiments.
Figure 5C:
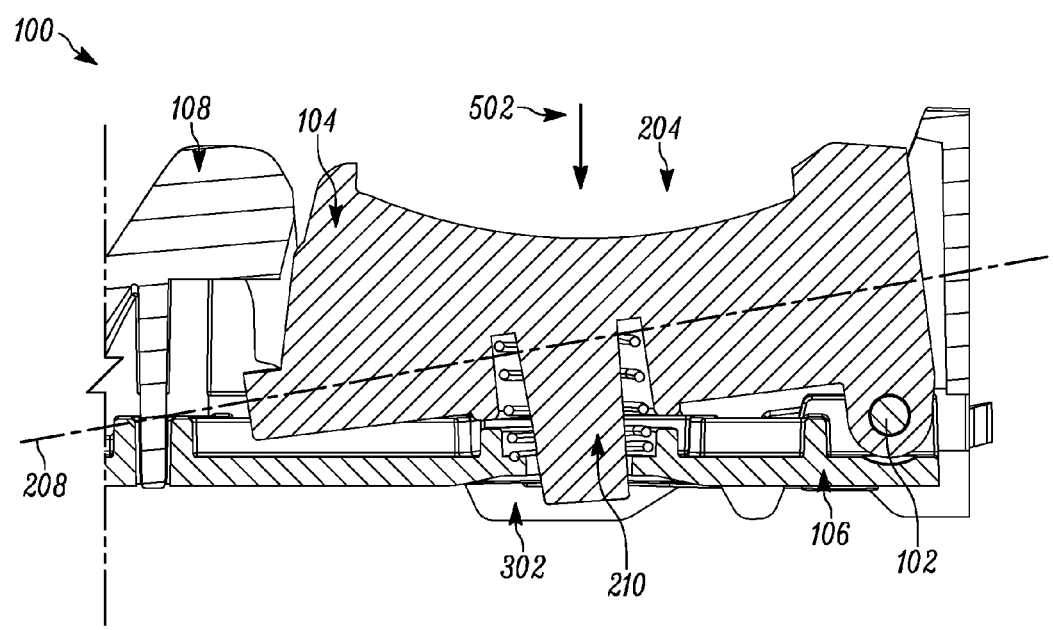
FIG. 5C depicts a cross-sectional view of a trigger assembly, in accordance with some embodiments.

FIGS. 5B and 5C depict a cross-sectional view of a trigger assembly, in accordance with some embodiments. The cross-sectional view is taken along the trigger-key longitudinal axis. In particular, FIGS. 5B and 5C depict the trigger assembly 100 under different conditions. The FIGS. 5B and 5C include the pivot shaft 102, the trigger key 104, the trigger-key support 106, the trigger bezel 108, the front face 204, the actuator 210, and the aperture 302. FIG. 5C further includes a trigger pressure 502. FIG. 5B depicts the trigger assembly 100 without external forces and FIG. 5C depicts the trigger assembly 100 with an external force.

In FIG. 5B, there is no force, and the trigger key 104 is not depressed. While not depressed, the trigger-key longitudinal axis 208 is in a first position and the actuator 210 is in a raised position relative to the aperture 302.

In FIG. 5C, there is a force, depicted as the trigger pressure 502. The trigger pressure 502 may take many different forms, to include at least an operator's finger squeezing the front face 204 of the trigger key 104 to apply the trigger pressure. When the trigger pressure 502 is applied to the on the front face 204, the trigger key 104 rotates about the pivot shaft 102. In this rotated position, the trigger-key longitudinal axis 208 is in a second position, at an angle relative to the first position depicted in FIG. 5B. Additionally, the actuator 210 is in a lowered position relative to the aperture 302. Although the actuator 210 may pass through the aperture 302, it is not necessary. The trigger assembly 100 may be positioned relative to a switch so that the switch passes through the aperture 302 to contact the actuator when the trigger key 104 is depressed.

In some embodiments, the trigger assembly may include a trigger-key with multiple actuators located at different positions along the trigger-key longitudinal axis, and multiple apertures, or an enlarged aperture, configured to allow the additional actuator to depress a second switch. The actuator may be sized and positioned appropriately such that a first actuator depresses a first switch after traveling a first distance, and the second actuator depresses a second switch after traveling a further distance.

Figure 6:
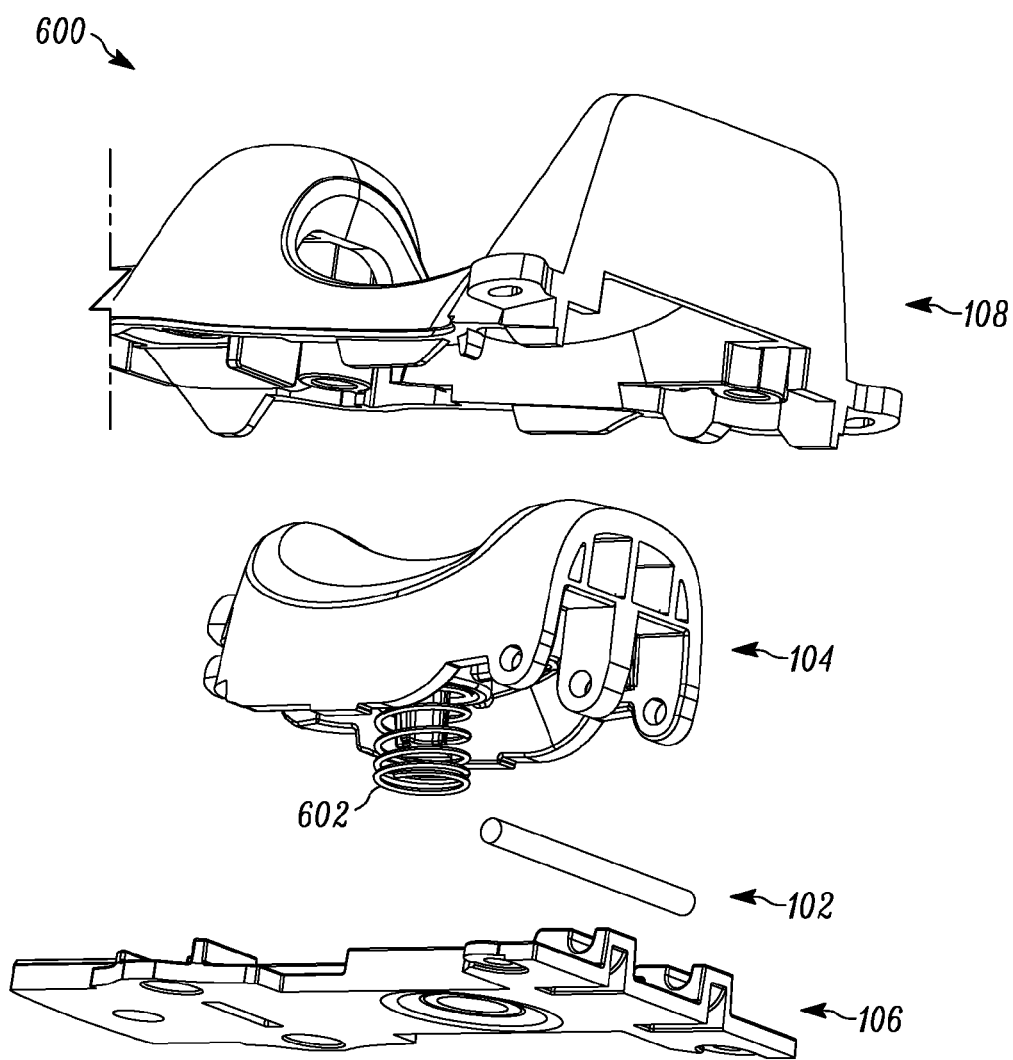
FIG. 6 is an unassembled view of a trigger assembly, in accordance with some embodiments.

FIG. 6 is an unassembled view of a trigger assembly, in accordance with some embodiments. In particular, FIG. 6 depicts the trigger assembly 600. The trigger assembly 600 comprises many of the same elements as the trigger assembly 100 to include the pivot shaft 102, the trigger key 104, the trigger-key support 106, and the trigger bezel 108. The trigger key 600 further includes a spring 602.

The spring 602 is configured to exert opposing forces on the back face of the trigger key 104 and the trigger-key support 106. When the trigger assembly is assembled, the spring is disposed between the trigger key 104 and the trigger-key support 106. The spring 602 may be positioned to be around the trigger-key actuator, have one end in contact with the trigger-key back face and the other end around the trigger-key support aperture. When the trigger assembly 600 is exposed to a trigger key pressure, similar to the trigger key pressure 502 of FIG. 5C, the spring counteracts the trigger key pressure 502. If the trigger key pressure is sufficiently strong to overcome the pressure exerted by the spring 602, the trigger key will depress, similar to the position depicted in FIG. 5C. When the trigger key pressure is sufficiently reduced or removed, the trigger key will be restored to the position depicted in FIG. 5B due to the counter-pressure of the spring 602.

Figure 7A:
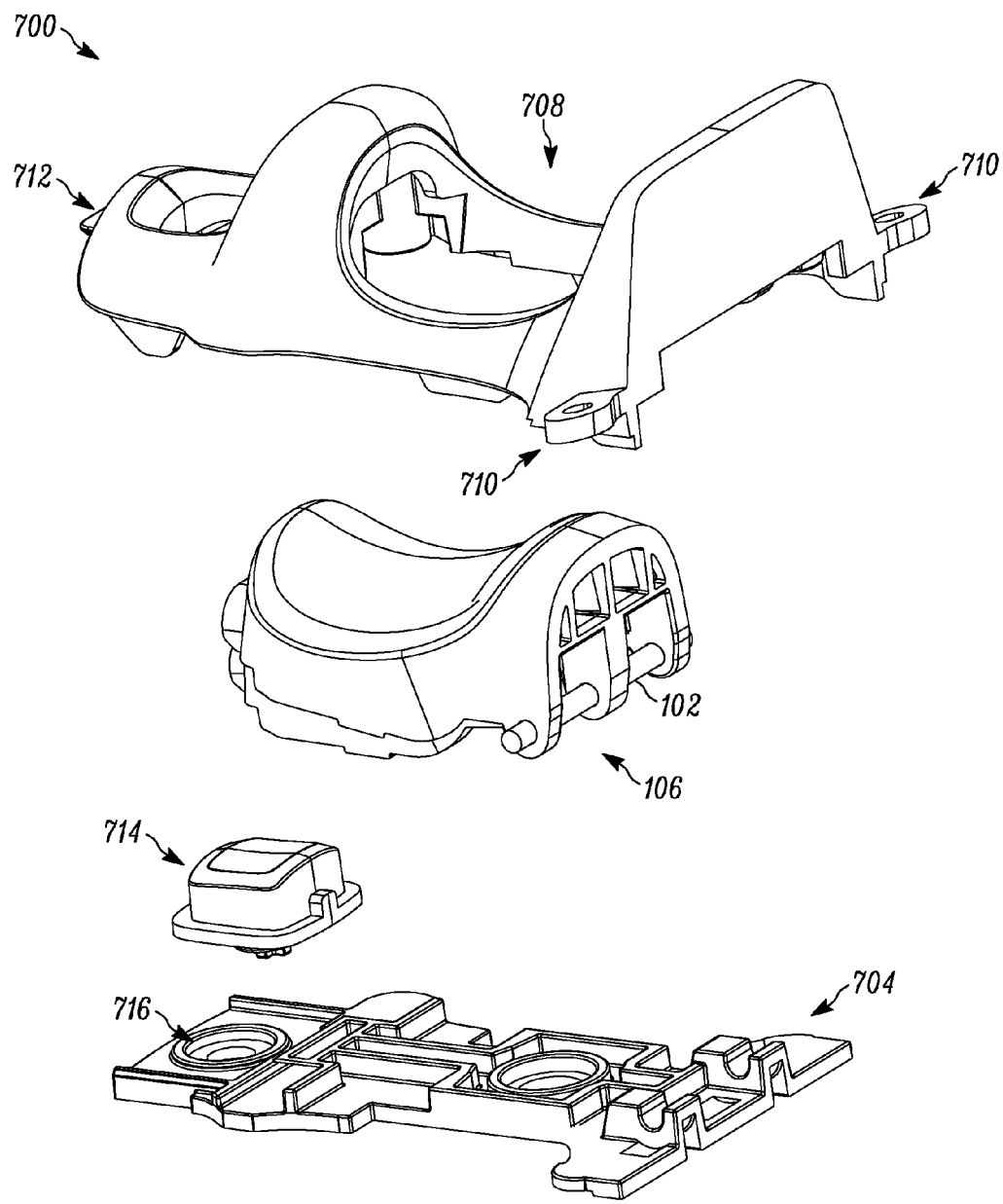
FIG. 7A is a partially assembled view of a trigger assembly, in accordance with some embodiments.
Figure 7B:
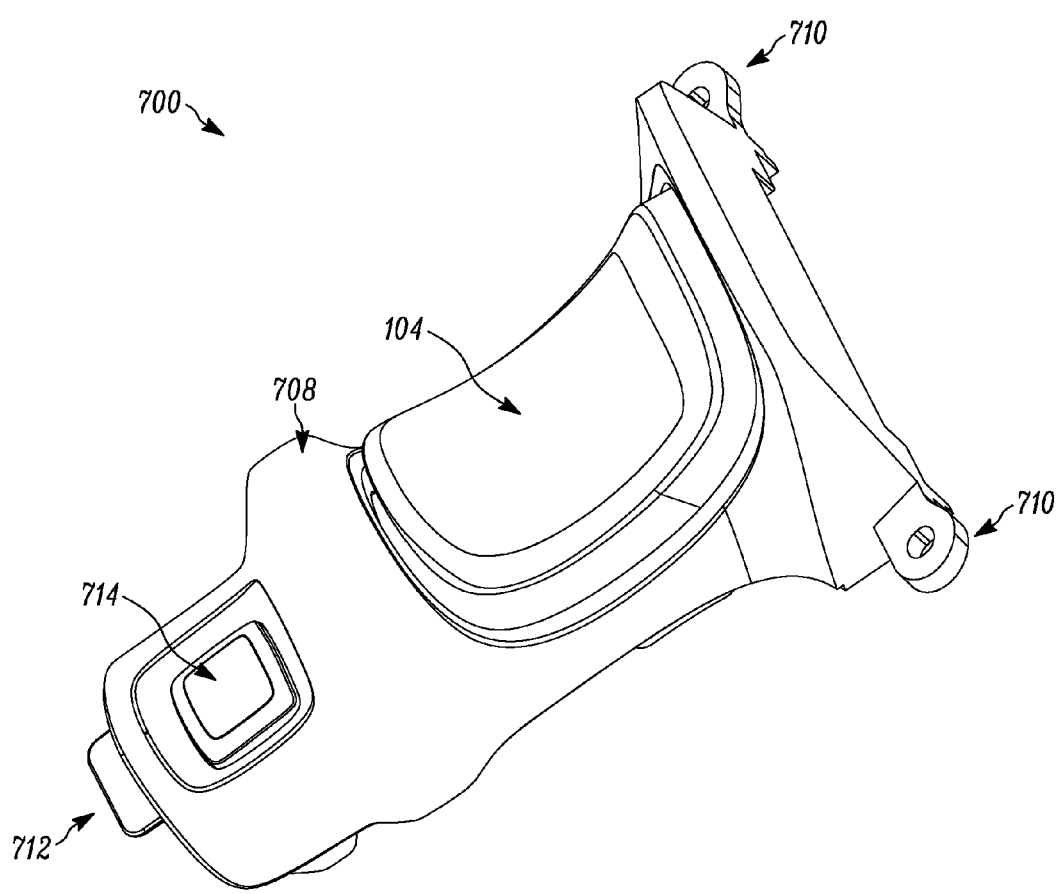
FIG. 7B is an assembled view of a trigger assembly, in accordance with some embodiments.

FIG. 7A is a partially assembled view of a trigger assembly, in accordance with some embodiments. FIG. 7B is an assembled view of the trigger assembly 700. In particular, FIG. 7A depicts an unassembled view of the trigger assembly 700. The trigger assembly 700 includes the pivot shaft 102 received into the trigger key 106. The trigger assembly 700 also includes a trigger-key support 704 that includes an additional key aperture 716, a trigger bezel 708 that includes mounting holes 710 and a mounting tab 712, and an additional key 714.

The trigger assembly 700 may further comprise a means to removably attach the trigger assembly to a mobile electronic device. The means to removably attach the trigger assembly to a mobile electronic device may comprise screws, snaps, press-fits, straps, a tab configured to be inserted into a slot on the mobile electronic device, any combination of means, or any other means for attachment as known by those with skill in the art. In one embodiment, the means includes the screw holes 710. The screw holes 710, while depicted as two separate holes on opposite sides of the trigger bezel, may be a single screw hole at a different location. The screw holes 710 are each configured to receive a screw, the screw attaching to a screw-hole on the mobile electronic device. The means to removably attach the trigger assembly to the mobile electronic device may further include, or alternately include, the mounting tab 712. The mounting tab 712 is configured to be received by a slot in the mobile electronic device.

The additional key 714 is configured to depress a switch through the additional-key aperture 716. In some embodiments, the additional key 714 may be configured to be a Push-to-Talk (PIT) key. In another embodiment, the additional key 714 may be configured to be a programmable key, able to be configured by an end user or manufacturer to actuate different functions of a mobile device. The additional key 714 may further include a spring disposed between the additional key 714 and the trigger support. The spring is configured to return the additional key 714 to a non-depressed state after the additional key is depressed.

Figure 8:
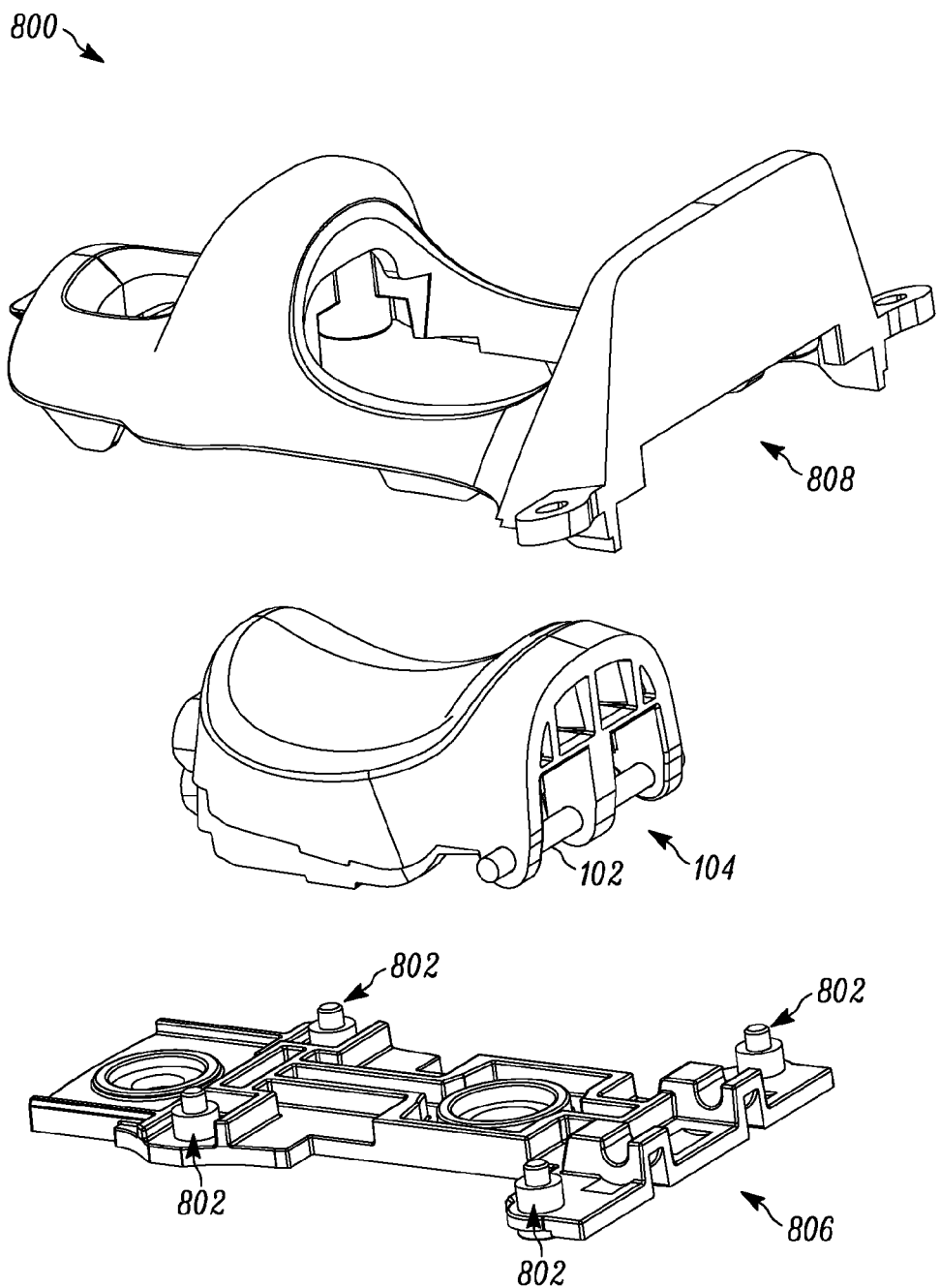
FIG. 8 is a partially assembled view of a trigger assembly, in accordance with some embodiments.

FIG. 8 is a partially assembled view of a trigger assembly, in accordance with some embodiments. In particular, FIG. 8 depicts the trigger assembly 800. The trigger assembly 800 includes the pivot shaft 102 and the trigger key 104 from the trigger assembly 100. The trigger assembly further includes attachment screws 802, the trigger-key support 806, and the trigger bezel 808.

In the trigger assembly 800, the trigger key 104 and the received pivot shaft 102, are disposed between the trigger-key support 806 and the trigger bezel 808. Further, the trigger bezel 808 attaches to the trigger-key support 806. The trigger-key support 806 includes through-holes and the trigger bezel 808 includes screw-holes. To attach the trigger-key support 806 to the trigger bezel 808, the attachment screws 802 are passed through the trigger-key support through holes and screw into the trigger bezel screw holes. Alternatively, the trigger-key support may be attached to the trigger bezel with snaps, adhesive, and other similar methods of attachment.

Figure 9:
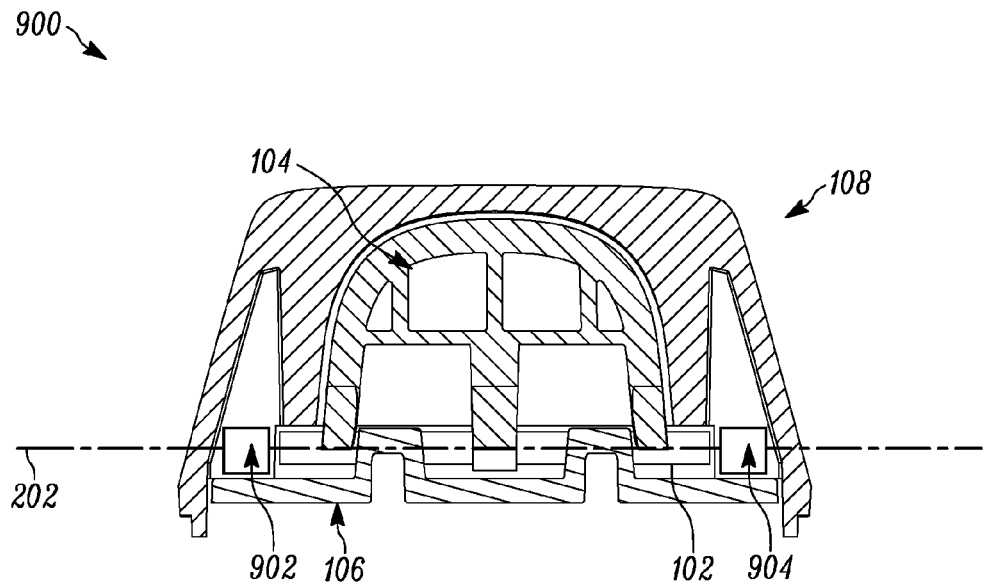
FIG. 9 is a cross-sectional view of a trigger assembly, in accordance with some embodiments.

FIG. 9 is a cross-sectional view of a trigger assembly, in accordance with some embodiments. The location of the cross section is in a similar location as the cross section of FIG. 5A. In particular, FIG. 9 depicts the trigger assembly 900. The trigger assembly 900 includes the pivot shaft 102, the trigger key 104, the trigger-key support 106, the trigger bezel 108, and the pivot-shaft longitudinal axis 202, all from the trigger assembly 100. The trigger assembly 900 also includes the pivot-shaft constraints 902 and 904.

The trigger assembly 900 includes at least one pivot-shaft constraint configured to restrict translation of the pivot shaft along the pivot-shaft longitudinal axis. The at least one pivot-shaft constraint may be either or both of the pivot-shaft constraints 902 and 904. The at least one pivot-shaft constraint is positioned along the pivot-shaft longitudinal axis 202 at one end of the pivot shaft 102. It constrains the pivot shaft 102 from translating along the pivot-shaft longitudinal axis in the direction of the pivot-shaft constraint. For example, the pivot-shaft constraint 902 constrains the pivot shaft 102 from translating to the left and the pivot-shaft constraint 904 constrains the pivot shaft 102 from translating to the right. Either one or both of the pivot shaft constraints may be disposed on the trigger-key support 106, the trigger key 104, or the trigger bezel 108.

Figure 10:
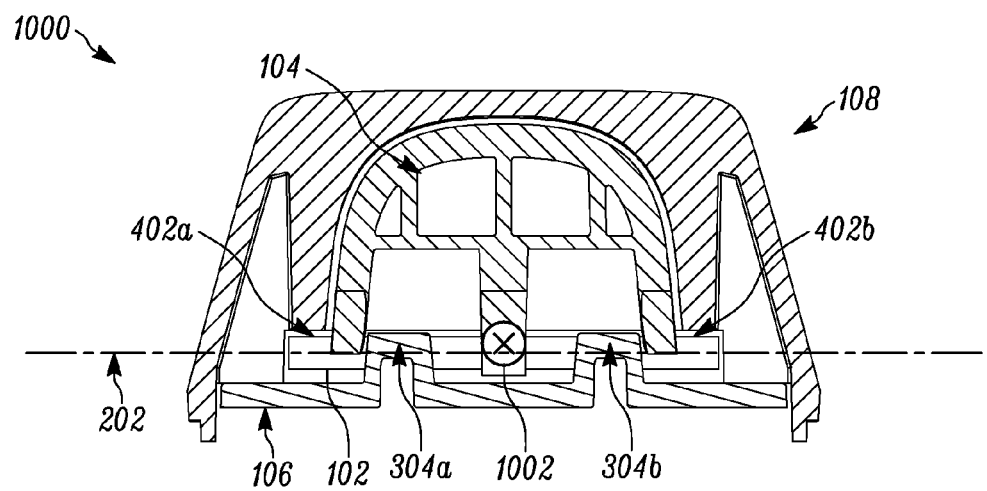
FIG. 10 is a cross-sectional view of a trigger assembly, in accordance with some embodiments.

FIG. 10 is a cross-sectional view of a trigger assembly, in accordance with some embodiments. In particular, FIG. 10 depicts a cross sectional view of the trigger assembly 1000. The cross-sectional view of the trigger assembly 1000 includes the pivot shaft 102, the pivot-shaft longitudinal axis 202, the trigger key 104, the trigger-key support 106 that includes a left-side trigger-key support 304a, a right-side trigger-key support 304b, the trigger bezel 108 that includes a left-side substantially flat surface 402a and a right-side substantially flat surface 402b, and a pivot-shaft center point 1002.

The trigger assembly 1000 includes at least two of the pivot-shaft supports (304a and 304b) at respective proximal locations relative to and on respective opposing sides of the center point 1002 along the pivot-shaft longitudinal axis 202; and at least two of the substantially flat surfaces (402a and 402b) at respective distal locations relative to and on respective opposing sides of the center point 1002 along the pivot-shaft longitudinal axis 202.

Figure 11:
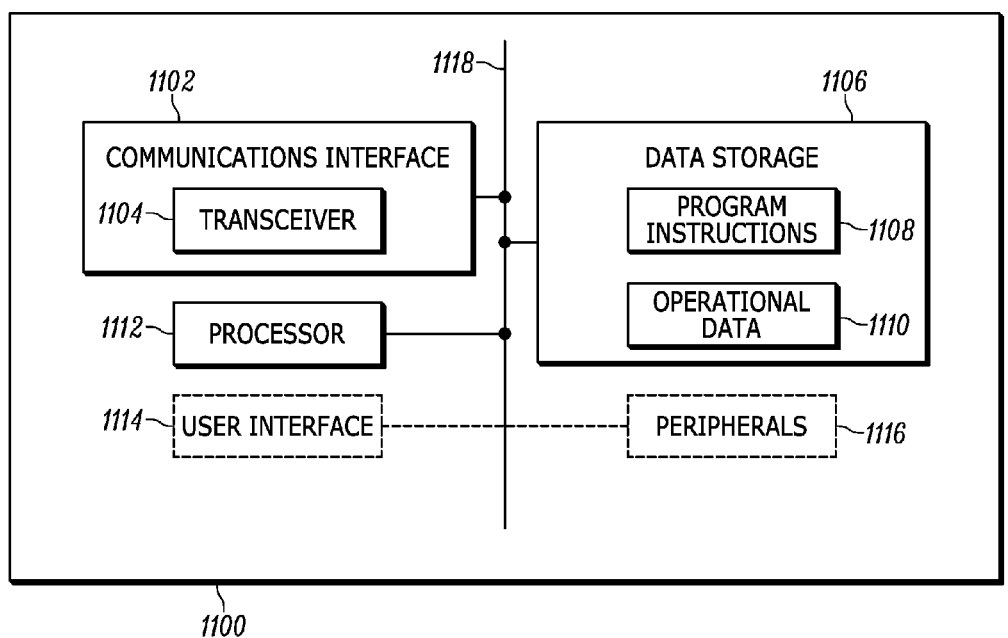
FIG. 11 is a block diagram of a mobile electronic device, in accordance with some embodiments.

FIG. 11 is a block diagram of a mobile electronic device, in accordance with some embodiments. In particular, FIG. 11 depicts an example mobile electronic device 1100, which may be configured to act as any of the mobile electronic devices disclosed herein. The example mobile electronic device 1100 includes a communications interface 1102 (that includes a transceiver 1104), data storage 1106 (that contains program instructions 1108 and operational data 1110), a processor 1112, a user interface 1114, peripherals 1116, and a communication bus 1118. This arrangement is presented by way of example and not limitation, as other example arrangements could be described here. In some embodiments, the mobile electronic device may omit some of the components, for example the transceiver 1104, as known by those with skill in the art.

As stated above, the communication interface 1102 includes the transceiver 1104. The transceiver 1104 may be configured (e.g., tuned) to receive and transmit on one of a set of channels. The transceiver 1104 may be a single component, or realized as a separate transmitter and receiver, as known by those with skill in the art. The communication interface 1102 may be configured to be operable for communication according to one or more wireless-communication protocols, some examples of which include LMR, LTE, APCO P25, ETSI DMR, TETRA, Wi-Fi, Bluetooth, and the like. The communication interface 1102 may also include one or more wired-communication interfaces (for communication according to, e.g., Ethernet, USB, and/or one or more other protocols.) The communication interface 1102 may include any necessary hardware (e.g., chipsets, antennas, Ethernet interfaces, etc.), any necessary firmware, and any necessary software for conducting one or more forms of communication with one or more other entities as described herein.

The data storage 1106 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 11, the data storage 1106 contains program instructions 1108 executable by the processor 1112 for carrying out various functions described herein, and further is depicted as containing and operational data 1110, which may include any one or more data values stored by and/or accessed by the computing device in carrying out one or more of the functions described herein.

The processor 1112 may include one or more processors of any type deemed suitable by those of skill in the relevant art, some examples including a general-purpose microprocessor and a dedicated digital signal processor (DSP).

The user interface 1114 may include one or more input devices (a.k.a. components and the like) and/or one or more output devices (a.k.a. components and the like.) With respect to input devices, the user interface 1114 may include one or more touchscreens, buttons, switches, microphones, and the like. With respect to output devices, the user interface 1114 may include one or more displays, speakers, light emitting diodes (LEDs), and the like. Moreover, one or more components (e.g., an interactive touchscreen and display of the user interface 1114 could provide both user-input and user-output functionality. Other user interface components could also be present, as known to those of skill in the art. In some embodiments, the computing device does not include a user interface.

The peripherals 1116 may include any computing device accessory, component, or the like, that is accessible to and useable by the computing device during operation. Example peripherals 1116 include a GPS receiver, an altimeter, an RSSI sensor, and the like. In some embodiments, the computing device does not include peripherals.

The various component of the mobile electronic device 1100 are all communicatively coupled with one another via a communication bus 1118 (or other suitable communication network, or the like.)

In some embodiments, any one of the trigger assemblies discussed herein may function as the user interface 1114. Additional, the peripherals 1116 may include any data acquisition device, and a printed circuit board may be part of the communications bus 1118.

Figure 12:
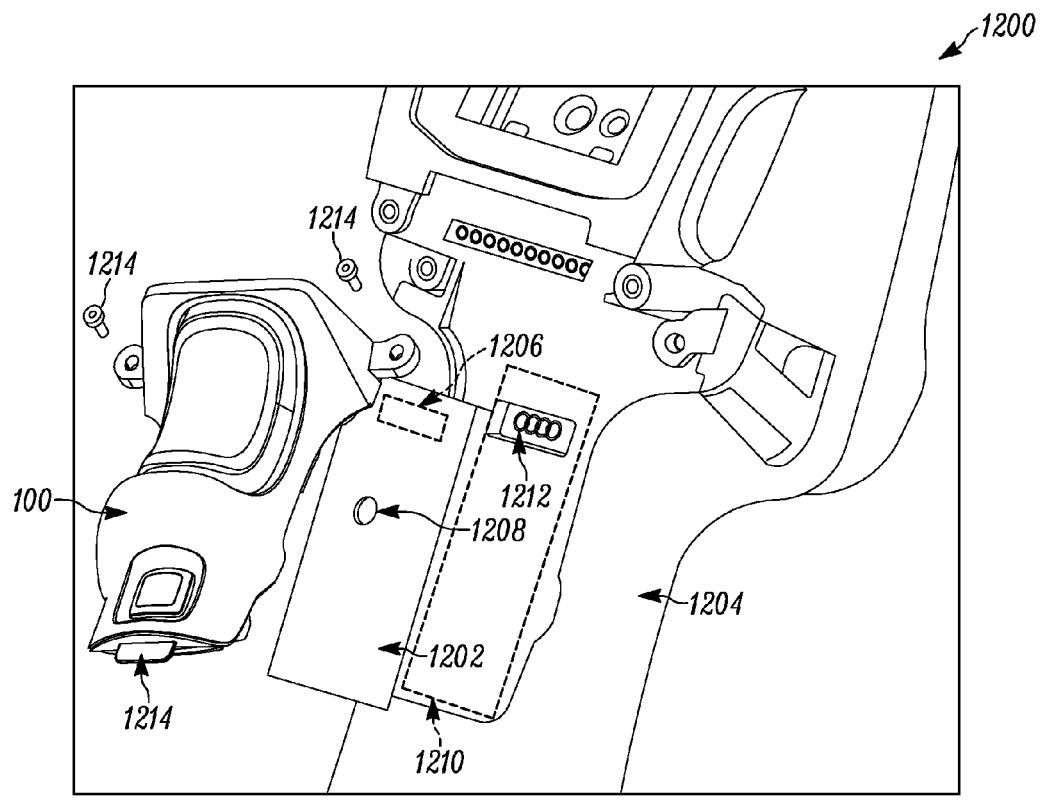
FIG. 12 is an unassembled view of a mobile electronic device, in accordance with some embodiments.

FIG. 12 is an unassembled view of a mobile electronic device, in accordance with some embodiments. In particular, FIG. 12 depicts the mobile electronic device 1200. The mobile electronic device 1200 includes the trigger assembly 100 (that includes a means to removably attach the trigger assembly 1214), a circuit board assembly 1202 (that includes a circuit-board electrical connector 1206 and a switch 1208), and a mobile electronic device housing 1204 (that includes a mobile-electronic-device electrical connector 1212 and a receptacle 1210).

The mobile electronic device includes the trigger assembly 100 by way of example, as any of the trigger assemblies discussed herein may be utilized with a mobile electronic device. In this embodiment, the trigger assembly 100 also includes the means to removably attach the trigger assembly 1214, which includes a tab configured to be inserted into a slot of the mobile electronic device 1200 and screws configured to go through a plurality of through holes on the trigger assembly into screw holes on mobile electronic device housing 1204. Although other means to removably attach the trigger assembly to the housing device may be used.

The circuit board assembly 1202 includes a switch configured to be depressed by the actuator. In an assembled position, the trigger assembly actuator contacts and depresses the switch on the circuit board assembly 1202 through the aperture on the trigger-key support when trigger key is depressed. The circuit-board electrical connector 1206 is positioned on opposing sides of the circuit board assembly 1202 than the switch 1208 by way of example.

The housing 1204 is configured to mechanically receive the circuit board 1202 at the receptacle 1210. When the circuit board assembly 1202 is mechanically received into the receptacle 1210, the circuit board circuit-board electrical connector 1206 mates with the mobile-electronic-device electrical connector 1212. The circuit board assembly 1202 is configured to relay communications between the switch 1208, through the mated electrical connectors (1206 and 1212) to activate functions of the mobile electronic device. One example function includes initiating a data-acquisition device to scan an object, such as a barcode, RFID tag, or the like.

In some embodiments, the mobile electronic device 1200 is further configured to interact with multiple keys. A first one of the multiple keys can be similar to the key described in the trigger assembly 100 and a second one of the multiple keys can be similar to the additional key 714. The first one of the multiple keys can be configured to actuate a data acquisition device scan and the second one of the multiple keys can be configured to be a PTT key or a programmable key.

In some embodiments, the circuit-board assembly comprises a sealing coat configured to seal an internal portion of the housing when the circuit board assembly is mechanically received in the housing.

Figure 13:
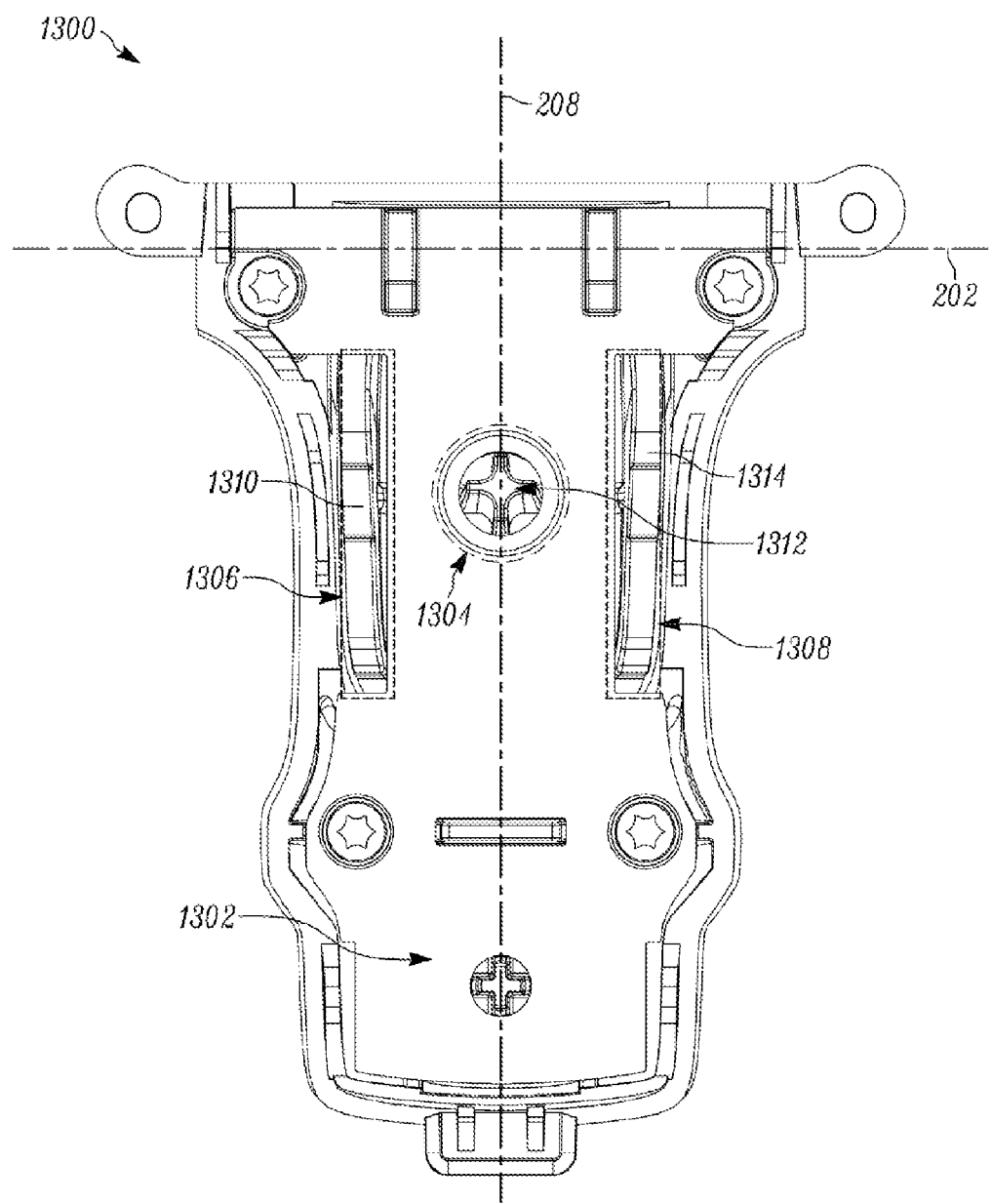
FIG. 13 is a bottom-side view of a trigger assembly, in accordance with some embodiments.

FIG. 13 is a bottom-side view of a trigger assembly, in accordance with some embodiments. In particular, FIG. 13 depicts the trigger assembly 1300. The trigger assembly comprises many of the similar components as the other trigger assembly. The trigger assembly includes the pivot-shaft longitudinal axis 202, the trigger-key longitudinal axis 208, a trigger-key support 1302 (that includes an actuator aperture 1304, and trigger-stop apertures 1310 and 1314). The trigger assembly 1300 includes a trigger key, similar to the trigger keys described herein, that includes trigger-stops 1306 and 1308, and an actuator 1312.

In an embodiment, the trigger assembly 1300 is installed in, or attached to, a housing of a mobile electronic device. Similar to the trigger key response to a trigger key pressure described in conjunction with FIGS. 5B and 5C, the actuator 1312 in the trigger assembly 1300 also travels a certain distance, moves a trigger-travel distance, to engage a switch. However, the trigger assembly 1300 is further configured to transfer a portion of the trigger-key pressure to the housing of a mobile electronic device after the actuator moves the trigger-travel distance. To transfer a portion of the trigger-key pressure to the housing, either one or both of the trigger-stops 1306 and 1308 pass through the trigger-stop apertures 1310 and 1314, respectively, and engage the housing. In other embodiments, the trigger-stop mechanism includes any number of different arrangements, to a single trigger stop, no trigger-stop apertures in the trigger-key support, an alternate orientation of the trigger stops, and other similar arrangements.

In embodiments with the trigger-stop mechanism, damage to a switch is prevented by only permitting the actuator to travel the trigger-travel distance to engage a switch. Once the trigger-travel distance is traveled, and the switch is engaged, portions of additional trigger-key pressure is transferred directly or indirectly to the housing of the mobile electronic device, when the surface areas of the trigger-stops interact with either the housing or the trigger-key support mounted on the housing.

Figure 14A:
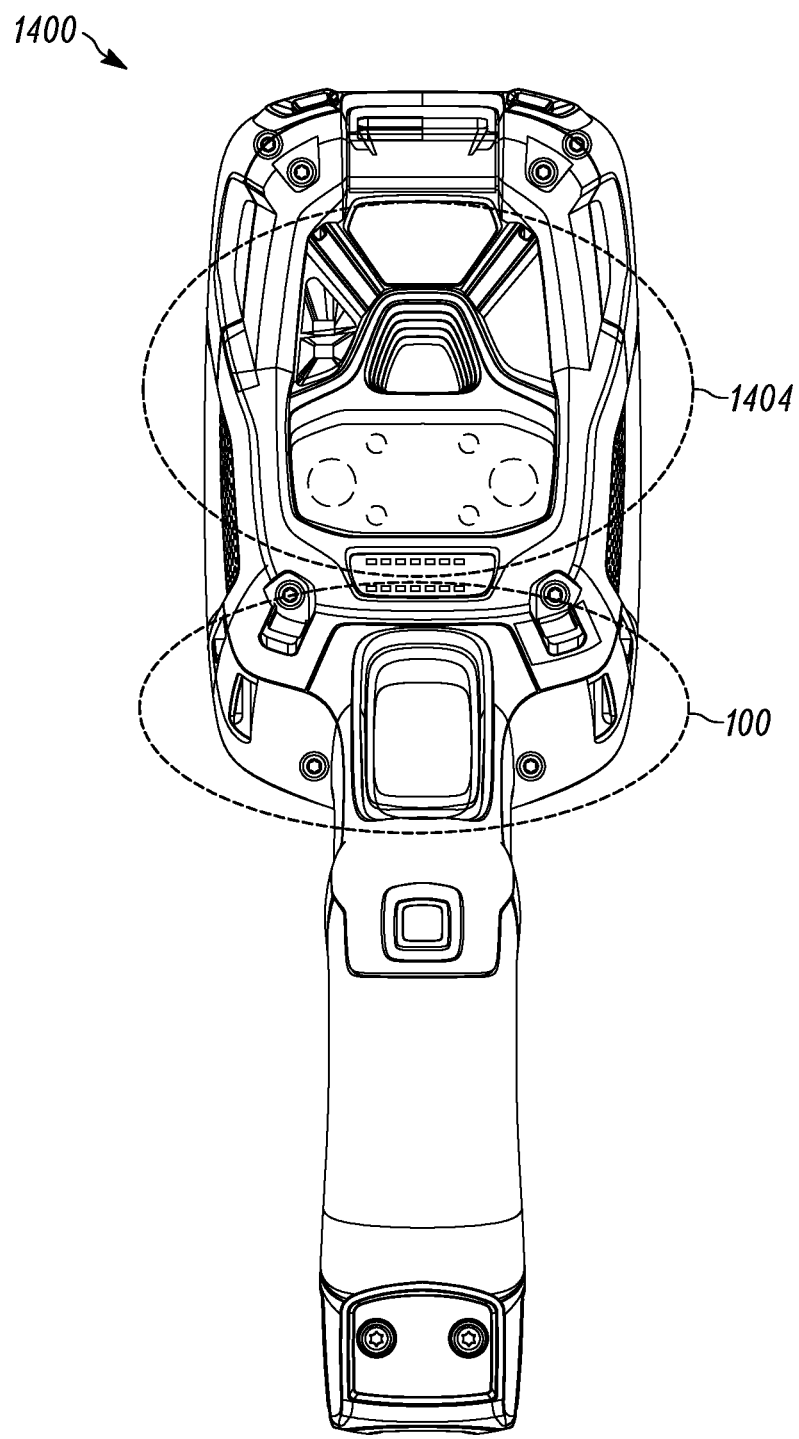
FIG. 14A is a front view of a mobile electronic device, in accordance with some embodiments.
Figure 14B:
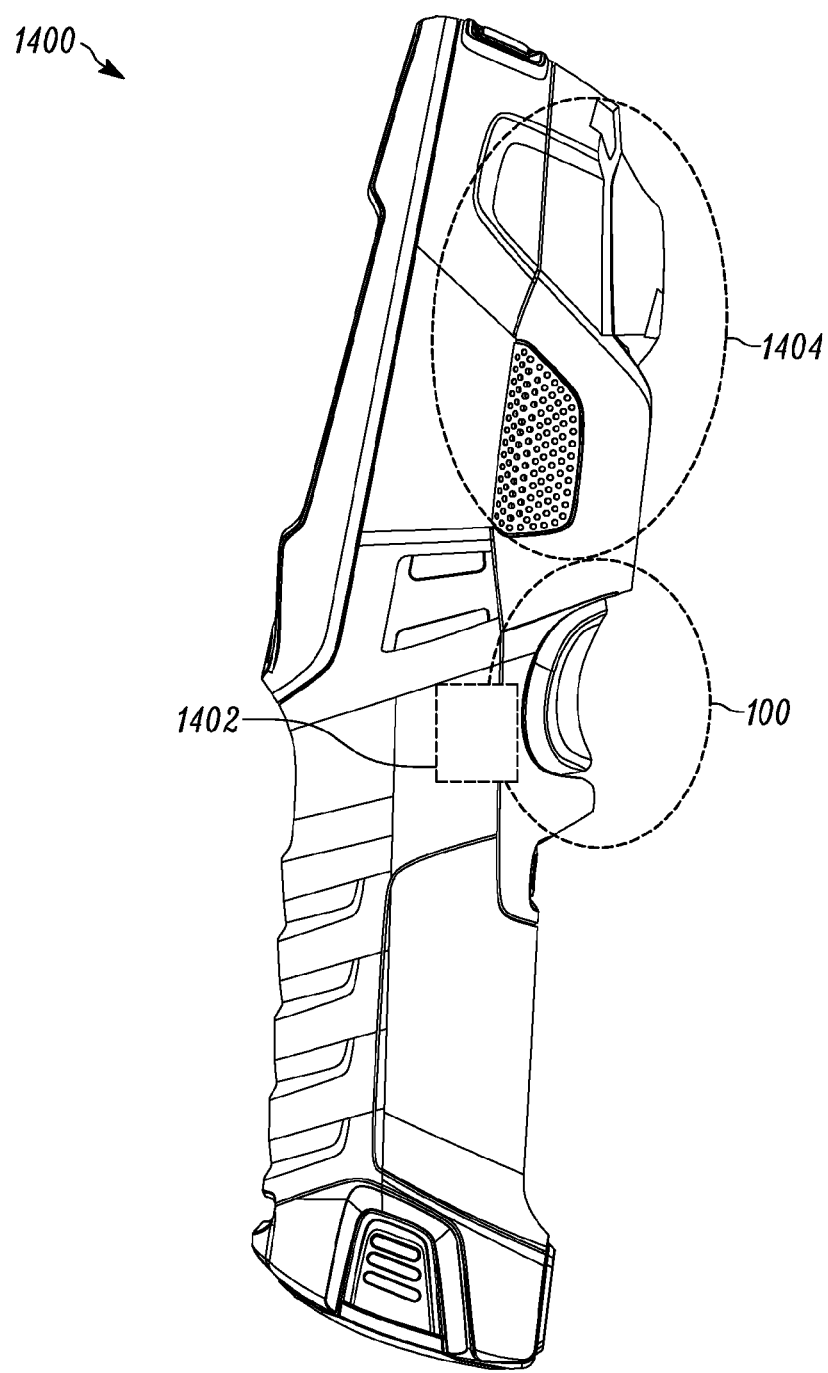
FIG. 14B is a side view of a mobile electronic device, in accordance with some embodiments.

FIGS. 14A and 14B depict a mobile electronic device, in accordance with some embodiments. In particular, FIG. 14A depicts a front view and FIG. 14B depicts a side view of the mobile electronic device 1400. The mobile electronic device 1400 is representative of any of the mobile electronic devices disclosed herein, to including but not limited to the mobile electronic devices 1100 and 1200.

The mobile electronic device 1400 includes a trigger assembly 100, a switch 1402, and a data acquisition device 1404. The trigger assembly 100 may also be any of the trigger assemblies discussed herein, and like those trigger assemblies, includes an actuator configured to depress a switch, such as the switch 1402. The switch 1402 is disposed in the scanner 1200 and is configured to be depressed by the actuator on the trigger assembly. The data-acquisition device 1404 is configured to actuate in response to the switch being depressed. Various data-acquisition devices could be a barcode scanner, a laser imager, an optical imager, an RFID reader, an NFC reader, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A trigger assembly comprising:
    a cylindrical pivot shaft having a pivot-shaft longitudinal axis;
    a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis;
    a trigger-key support having an aperture for the actuator to pass through; and
    a trigger bezel having a plurality of substantially flat surfaces positioned to constrain the pivot shaft.

2. The trigger assembly of claim 1, wherein the trigger-key support further comprises a plurality of pivot-shaft supports, each pivot-shaft support including a concave surface configured to receive the cylindrical pivot shaft.

3. The trigger assembly of claim 2, wherein each pivot-shaft support further comprises walls adjacent to the concave surface, wherein the walls and the concave surface are collectively configured in a U shape.

4. The trigger assembly of claim 2, wherein:
at least two of the pivot-shaft supports are at respective proximal locations relative to and on respective opposing sides of a center point along the pivot-shaft longitudinal axis; and
at least two of the substantially flat surfaces are at respective distal locations relative to and on respective opposing sides of the center point along the pivot-shaft longitudinal axis.

5. The trigger assembly of claim 1, further comprising a spring configured to exert opposing forces on the back face and the trigger-key support.

6. The trigger assembly of claim 1, further comprising means to removably attach the trigger assembly to a mobile electronic device.

7. The trigger assembly of claim 1, further comprising a trigger-key stop mechanism.

8. The trigger assembly of claim 1, further comprising at least one additional key.

9. The trigger assembly of claim 8, wherein the at least one additional key comprises a programmable key.

10. The trigger assembly of claim 1, wherein:
the trigger key and the received pivot shaft are disposed between the trigger-key support and the trigger bezel, and
the trigger bezel attaches to the trigger-key support.

11. The trigger assembly of claim 1, wherein the concave surface has a parabolic shape.

12. The trigger assembly of claim 1, wherein the concave surface has a semi-circular shape.

13. The trigger assembly of claim 1, further comprising at least one pivot-shaft constraint configured to restrict translation of the pivot shaft along the pivot-shaft longitudinal axis.

14. The trigger assembly of claim 13, wherein at least one of the at least one pivot-shaft constraints is disposed on the trigger key.

15. The trigger assembly of claim 13, wherein at least one of the at least one pivot-shaft constraints is disposed on the trigger bezel.

16. The trigger assembly of claim 13, wherein at least one of the at least one pivot-shaft constraints is disposed on the trigger-key support.

17. The trigger assembly of claim 1 wherein the substantially flat surfaces constrain the pivot shaft in opposition to the plurality of pivot-shaft supports, the substantially flat surfaces located at different positions along the pivot-shaft longitudinal axis than are the pivot-shaft supports.

18. A mobile electronic device comprising:
a trigger assembly comprising:
a cylindrical pivot shaft having a pivot-shaft longitudinal axis,
a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis,
a trigger-key support having an aperture for the actuator to pass through, the trigger-key support further having a plurality of pivot-shaft supports, wherein each pivot-shaft support includes a concave surface configured to receive the cylindrical pivot shaft, and
a trigger bezel having a plurality of substantially flat surfaces positioned to constrain the pivot shaft;
a circuit-board assembly comprising an electrical connector and a switch, the switch configured to be depressed by the actuator; and
a housing configured to:
mechanically receive the circuit-board assembly,
electrically connect to the electrical connector, and
removably attach to the trigger assembly.

19. The mobile electronic device of claim 18, wherein the trigger assembly further comprises a trigger-stop mechanism that is configured, in response to a trigger-key pressure, to:
permit the actuator to move a trigger-travel distance to engage the switch; and
transfer a portion of the trigger-key pressure to the housing after the actuator moves the trigger-travel distance.

20. The mobile electronic device of claim 18, wherein the circuit-board assembly comprises a sealing coat configured to seal an internal portion of the housing when the circuit board assembly is mechanically received in the housing.

21. A mobile electronic device comprising:
a trigger assembly comprising:
a cylindrical pivot shaft having a pivot-shaft longitudinal axis,
a trigger key having a front face, a back face opposite the front face, an actuator extending from the back face, a first end, and a trigger-key longitudinal axis, wherein the first end has a plurality of through holes arranged to receive the cylindrical pivot shaft such that the pivot-shaft longitudinal axis is perpendicular to the trigger-key longitudinal axis,
a trigger-key support having an aperture for the actuator to pass through, the trigger-key support further having a plurality of pivot-shaft supports, wherein each pivot-shaft support includes a concave surface configured to receive the cylindrical pivot shaft, and
a trigger bezel having a plurality of substantially flat surfaces positioned to constrain the pivot shaft;
a switch configured to be depressed by the actuator; and
a data-acquisition device configured to actuate in response to the switch being depressed.

* * * * *